(12) United States Patent
Hall

(10) Patent No.: US 6,466,406 B1
(45) Date of Patent: Oct. 15, 2002

(54) DATA-STORAGE CARTRIDGE HAVING ONE OR MORE SURFACE RECESSES FOR IMPROVED INTERNAL AIR CIRCULATION

(75) Inventor: David L. Hall, Salt Lake City, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/527,156

(22) Filed: Mar. 17, 2000

(51) Int. Cl.[7] .............................. G11B 23/03; G11B 3/70
(52) U.S. Cl. ....................................... 360/133; 369/291
(58) Field of Search ........................... 360/133; 369/291

(56) References Cited

U.S. PATENT DOCUMENTS

| | | | |
|---|---|---|---|
| 4,969,061 A | 11/1990 | Patterson et al. | ........... 360/133 |
| 5,687,048 A | * 11/1997 | Mizuta | ........................ 360/133 |

FOREIGN PATENT DOCUMENTS

JP        4-159676        * 6/1992

* cited by examiner

*Primary Examiner*—David Davis
(74) *Attorney, Agent, or Firm*—Woodcock Washburn LLP

(57) ABSTRACT

A data-storage cartridge comprises an outer shell having an inner surface. The data-storage cartridge also comprises a data-storage medium having an outer peripheral edge and a centrally-disposed hub. The data-storage medium is rotatably disposed within the outer shell so that the data-storage medium faces the inner surface of the outer shell. A recess is formed in the inner surface. The recess preferably extends from a first position proximate the outer peripheral edge of the data-storage medium to a second position proximate the hub. A liner is attached to the inner surface of the outer shell so that the liner covers a portion of the recess between the first and the second ends of the recess. The liner and the recess thereby form a passage for circulating air between the outer peripheral edge and the hub of the data-storage medium. This circulation minimizes the pressure differential across the data-storage medium, and thereby minimizes the vertical displacement of the data-storage medium caused by the pressure differential. The noted circulation also increases the airflow over the upper surface of the data-storage medium, and thereby reduces oscillations in the data-storage medium.

41 Claims, 10 Drawing Sheets

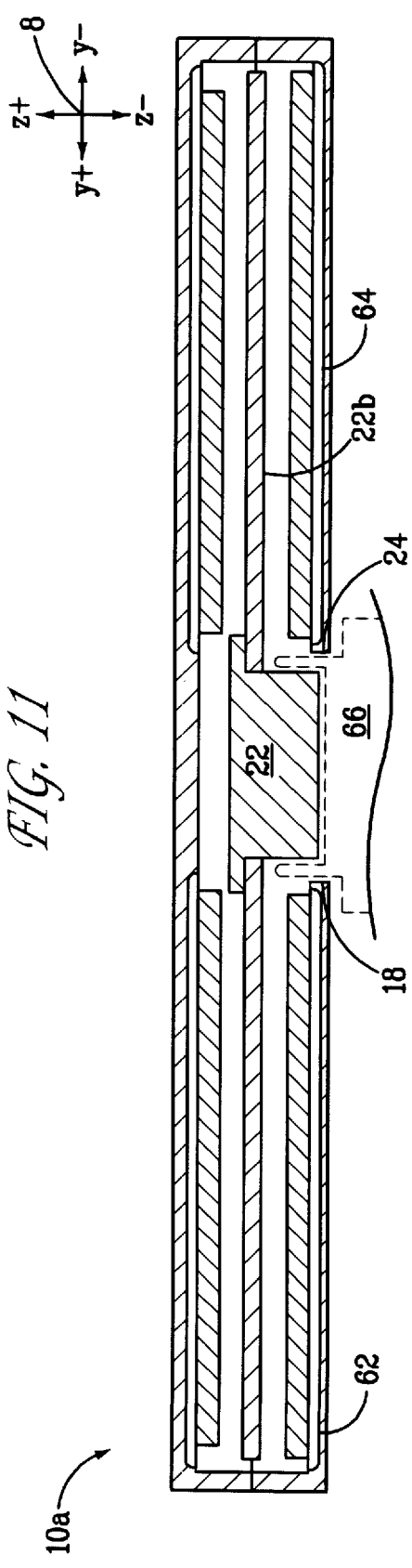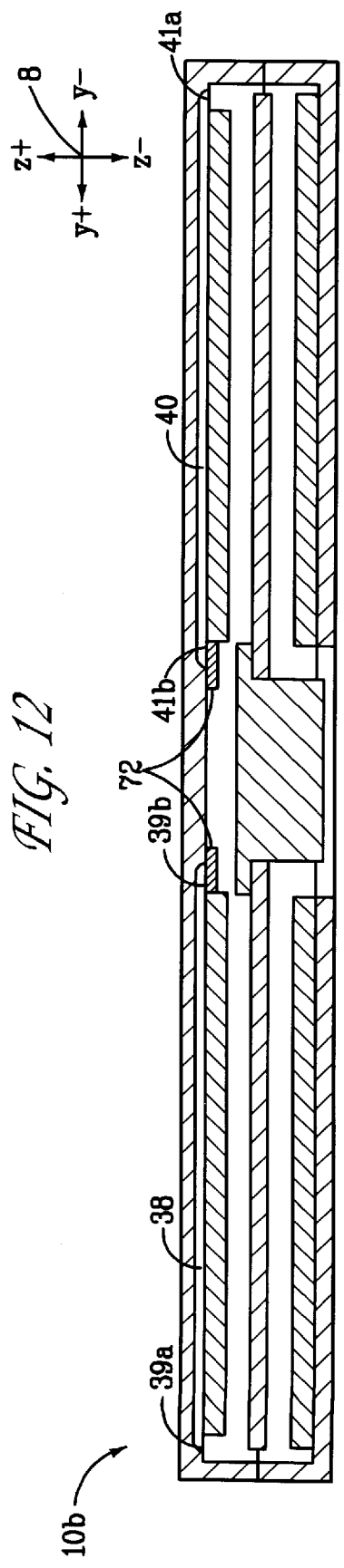

DATA-STORAGE CARTRIDGE HAVING ONE OR MORE SURFACE RECESSES FOR IMPROVED INTERNAL AIR CIRCULATION

FILED OF THE INVENTION

The present invention relates generally to data-storage cartridges for storing digital information. More particularly, the invention relates to a data-storage cartridge having surface recesses formed therein to enhance the circulation of air within the cartridge.

BACKGROUND OF THE INVENTION

FIG. 1 is a cross-sectional illustration of a conventional data-storage cartridge 100. The data-storage cartridge 100 comprises an outer shell 101 having an upper half 102 and a lower half 103. The data-storage cartridge 100 also includes a circular data-storage medium 104. The data-storage medium 104 is rotatably disposed within the outer shell 101. The data-storage medium has an upper recording surface 104a, a lower surface recording 104b, and an outer edge 104c. The data-storage medium 104 also includes a centrally-disposed hub 106. The hub 106 includes an upper surface 106a and a lower surface 106b. A fabric liner 110 is disposed on an inner surface 102a of the outer shell upper half 102. A fabric liner 111 is likewise disposed on an inner surface 103a of the outer shell lower half 103.

The lower half 103 of the outer shell 101 includes a hub access opening 107. A portion of the hub 106 is rotatably disposed within the hub access opening 107. The hub 106 and the hub access opening 107 are sized so that a gap 108 exists between the hub 106 and the hub access opening 107. This arrangement allows the hub 106 to freely rotate within the hub access opening 107. The hub 106 is adapted to engage a spindle of a disk drive (not shown) when the data-storage cartridge 100 is inserted into the disk drive. The spindle is coupled to a spindle motor within the disk drive. The spindle motor rotates the data-storage medium 104 via the spindle and the hub 106.

The outer shell 101 also includes a head access opening 109. The head access opening 109 permits the read/write heads of the disk drive to access to the data-storage medium 104. A spring-loaded shutter (not shown) covers the head access opening 109 when the data-storage cartridge 100 is not inserted in the disk drive.

The rotational motion of the data-storage medium 104 induces various airflow patterns within the data-storage cartridge 100. In particular, the air in contact with the rotating data-storage medium 104 flows radially outward, i.e., toward the outer edge 104c of the medium 104. This airflow is induced by the combined effect of the rotational motion of the data-storage medium 104 and viscous forces between the medium 104 and the surrounding air. (The airflow patterns within the data-storage cartridge 100 are represented by various arrows 112 shown throughout FIG. 1.)

The outward displacement of air along the lower surface 104b of the data-storage medium 104 causes air to be drawn into the data-storage cartridge 100 through the gap 108 (see the arrows 112). Hence, the air that is outwardly displaced along the lower surface 104b is replaced by air drawn through the gap 108. A substantial portion of the outwardly-displaced air eventually exits the data-storage cartridge 100 by way of the head access opening 109 after reaching the outer edge 104c of the data-storage medium 104.

The upper half 102 of the outer shell 101, by contrast, does not include any openings that allow a substantial volume of ambient air to enter the data-storage cartridge 100. The lack of such openings, in conjunction with the outward displacement of air along the upper surface 104a of the data-storage medium 104, causes a pressure differential to develop between the top and the bottom of the data-storage medium 104. In particular, the aerodynamic pressure above the upper surfaces 104a and 106a decreases in relation to the aerodynamic pressure below the lower surfaces 104b and 106b. The resulting pressure differential across the medium 104 is greatest proximate the hub 106, and decreases with increasing radial distance from the hub 106. The pressure differential is related to the rotational velocity of the data-storage medium 104. Specifically, higher rotational velocities increase the magnitude of the pressure differential.

The pressure differential across the data-storage medium 104 can produce a number of undesirable effects. For example, the pressure differential tends to lift the data-storage medium 104 upward, i.e., in the $z^+$ direction (the $z^+$ direction is denoted on a coordinate system 8 shown in FIG. 1). This upward displacement can result in inadvertent contact between the medium upper surface 104a and a flying read/write head positioned proximate the upper surface 104a during data storage and retrieval operations. Furthermore, the upward displacement of the medium 104 can increase the mechanical loading of a non-flying read/write head beyond acceptable levels. Inadvertent head-medium contact and high mechanical loading can result in damage and premature wear of the read/write head and the data-storage medium 104. These factors can also lead to a loss of data from the data-storage medium 104.

In addition, the vertical displacement of the data-storage medium 104 can make it difficult to load the read/write head onto the data-storage medium 104. In particular, substantial vertical displacement of the data-storage medium 104 can cause the read/write head and its supporting structure to contact the data-storage medium 104 as the read/write head is moved from its parked position beside the medium 104. Such contact can damage the data-storage medium 104, the read/write head, and the supporting structure of the read/write head. Furthermore, the need to account for the vertical displacement of the data-storage medium 104 may cause the height (z dimension) of the data-storage cartridge 104 to be greater than would otherwise be required. The need to account for this displacement can also cause the height of the disk drive in which the cartridge 104 is utilized to be greater than would otherwise be required.

In addition, low rates of airflow over the upper surface 104a of the medium 104 can result in oscillations in the medium 104. More particularly, low airflow rates across the surface 104a exert minimal aerodynamic damping on the data-storage medium 104. Minimal damping increases the potential for the data-storage medium 104 to oscillate. Oscillation of the medium 104 can result in the problems and disadvantages described above in connection with the vertical displacement of the data-storage medium 104. Furthermore, low rates of airflow over the upper surface 104a may cause a read/write head positioned above the upper surface 104a to operate at unacceptably high temperatures.

The above discussion illustrates the existing need for a data-storage cartridge having a data-storage medium that operates with a minimal aerodynamic pressure differential across its upper and lower surfaces. Optimally, the cartridge should operate with sufficient airflow across its upper surface to inhibit substantial oscillation of the medium, and to adequately cool a read/write head positioned above the upper surface. The present invention is directed to these and other objects.

SUMMARY OF THE INVENTION

In accordance with the above-noted objects, a presently-preferred embodiment of the invention comprises a data-storage cartridge having an outer shell. The outer shell includes an upper half having an inner surface. A recess is formed in the inner surface. The recess extends between a first position proximate an outer periphery of the inner surface and a second position proximate a center of the inner surface. The outer shell also includes a lower half. A hub access opening is formed in the lower half of the outer shell. The hub access opening is substantially aligned with the center of the inner surface.

The data-storage cartridge also comprises a data-storage medium. The data-storage medium has a centrally-disposed hub and an outer edge. The data-storage medium is rotatably disposed within the outer shell so that at least a portion of the hub is positioned within the hub access opening and at least a portion of the outer edge is positioned proximate the outer periphery of the inner surface.

The data-storage cartridge further comprises a liner positioned along the outer shell inner surface so that the liner covers a portion of the recess between the first and the second ends of the recess. The liner and the recess thereby form a passage for directing air toward the hub of the data-storage medium in response to rotation of the data-storage medium. Directing air toward the hub of the data-storage medium in this manner minimizes a difference in aerodynamic pressure across the data-storage medium.

Further in accordance with the above-noted objects, another presently-preferred embodiment of the invention comprises a data-storage cartridge having a rotatable data-storage medium. The data-storage medium includes a centrally-disposed hub and an outer peripheral edge. The data-storage cartridge also comprises an outer shell that encloses at least a portion of the data-storage medium. The outer shell has an inner surface that faces toward the data-storage medium. A recess is formed in the inner surface. The recess has a first end and a second end. The first end is located proximate the outer peripheral edge of the data-storage medium and the second end is located proximate the hub of the data-storage medium in one particular preferred embodiment of the invention.

The data-storage cartridge also includes a liner attached to the inner surface of the outer shell so that the liner covers a portion of the recess between the first and the second ends of the recess. The recess and the liner thereby form a passage for directing air therethrough in response to rotation of the data-storage medium.

Further in accordance with the above-noted objects, another presently-preferred embodiment of the invention comprises a data-storage cartridge having a data-storage medium that is rotatable about a center hub. The data-storage cartridge also includes an outer shell having an inner surface. The outer shell encloses the data-storage medium so that at least a portion of the inner surface is positioned above the data-storage medium. A recess is formed in the inner surface. The recess extends between a first position and a second position. The first position is located proximate an outer edge of the inner surface and the second position is located proximate a center of the inner surface in one particular preferred embodiment of the invention.

The data-storage cartridge also includes an airflow barrier. The airflow barrier covers a portion of the recess between the first and the second positions so that the airflow barrier and the recess form a passage extending between the first and the second positions. The passage circulates air toward the hub of the data-storage medium in response to rotation of the data-storage medium.

Further in accordance with the above-noted objects, a preferred method for minimizing a pressure differential across a data-storage medium within a data-storage cartridge comprises the step of rotating the data-storage medium and thereby causing air to flow toward an outer peripheral edge of the data-storage medium. The method further comprises the step of circulating the air away from the outer peripheral edge of the data-storage medium by way of a passage formed in an outer shell of the data-storage cartridge. The method also includes the step of discharging the air from the passage proximate a center hub of the data-storage medium.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 11 is a sectional view of a second alternative embodiment of the data-storage cartridge shown in FIGS. 2 through 7B;

FIG. 12 is a sectional view of a third alternative embodiment of the data-storage cartridge shown in FIGS. 2 through 7B.

DESCRIPTION OF PREFERRED EMBODIMENTS

Figure 1:
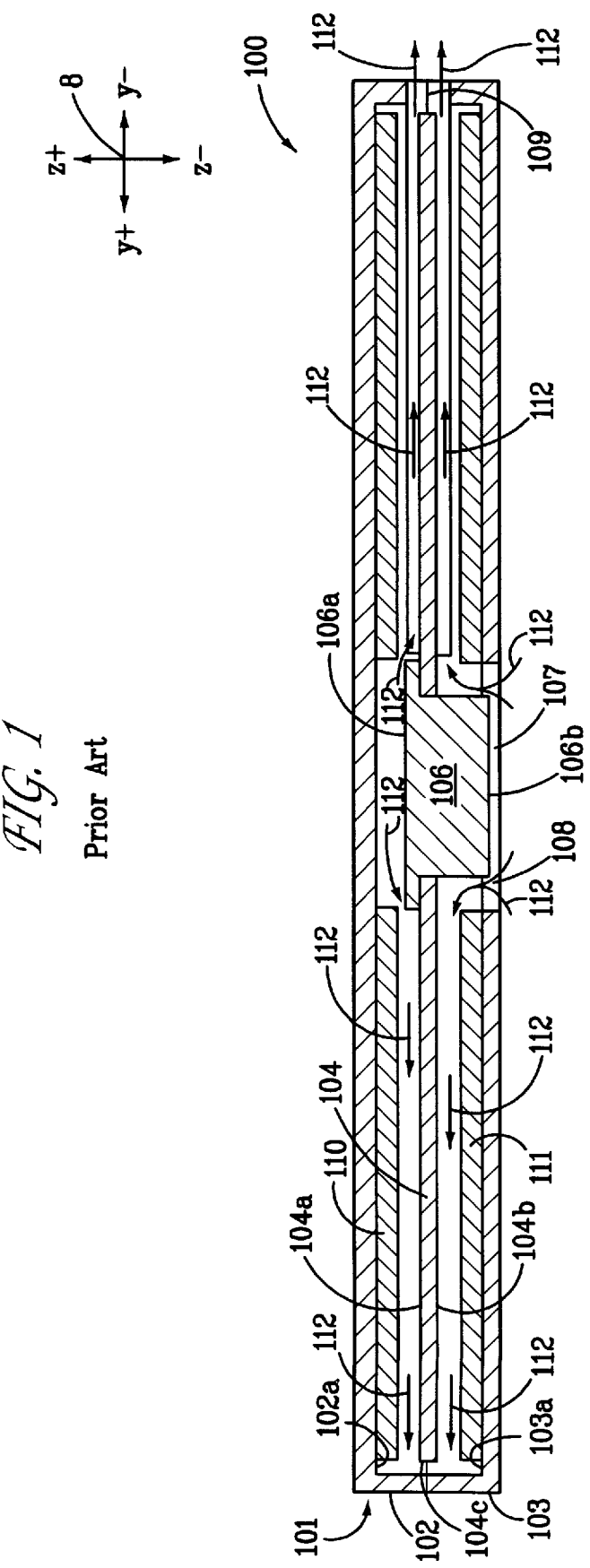
FIG. 1 is a sectional view of a conventional data-storage cartridge.
Figure 2:
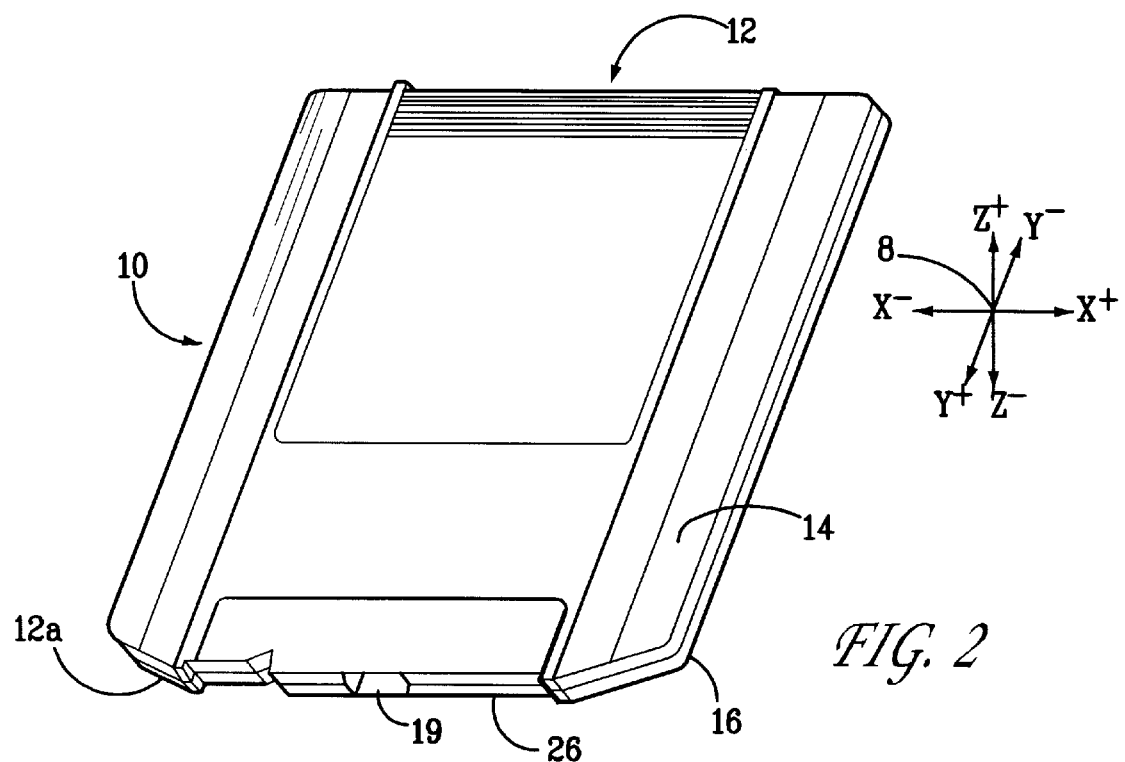
FIG. 2 is a top perspective view of a data-storage cartridge in accordance with the present invention.

A presently-preferred embodiment of the invention is illustrated in FIGS. 2 through 7B. The figures are each referenced to the coordinate system 8 denoted in each illustration. The invention provides a data-storage cartridge 10. The data-storage cartridge 10 comprises an outer shell 12. The outer shell 12 includes an upper half 14 having an inner surface 14a (see FIG. 5). The inner surface 14a has a first edge 14b and an opposing second edge 14c. The outer shell 12 also includes a lower half 16 having an inner surface 16a (see FIG. 6). The upper and lower shell halves 14 and 16 mate to form the outer shell 12.

Figure 3:
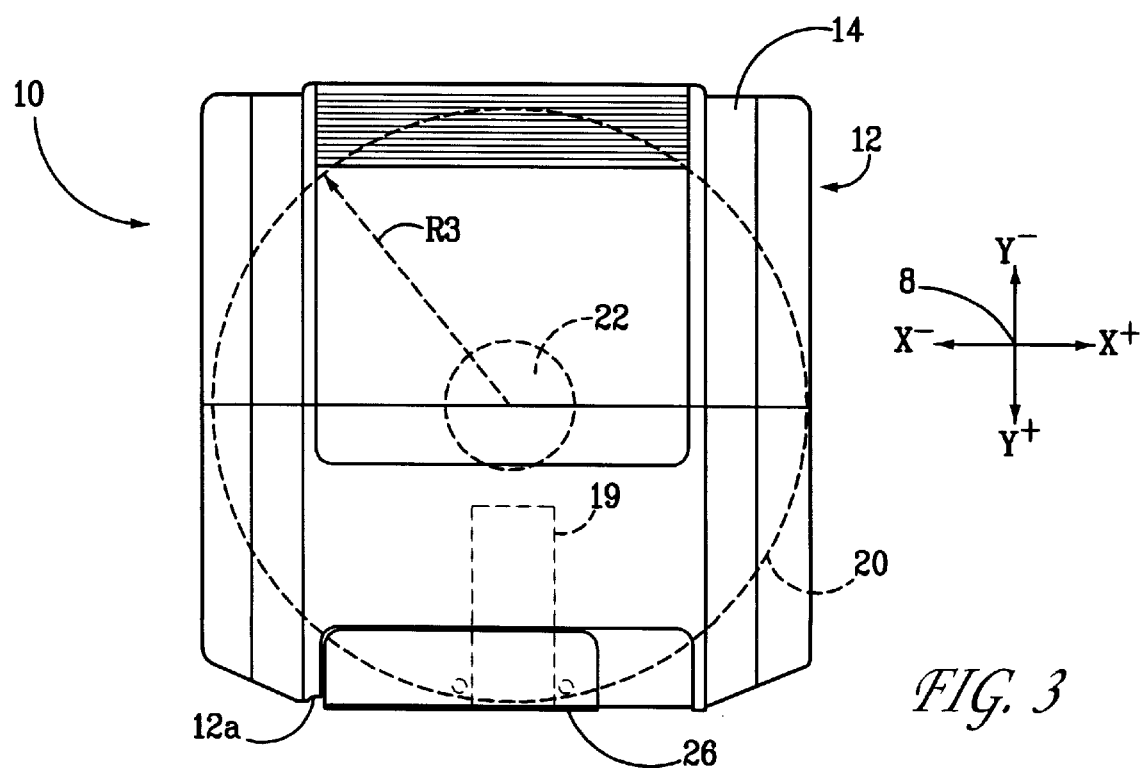
FIG. 3 is a top view of the data-storage cartridge shown in FIG. 2.
Figure 4:
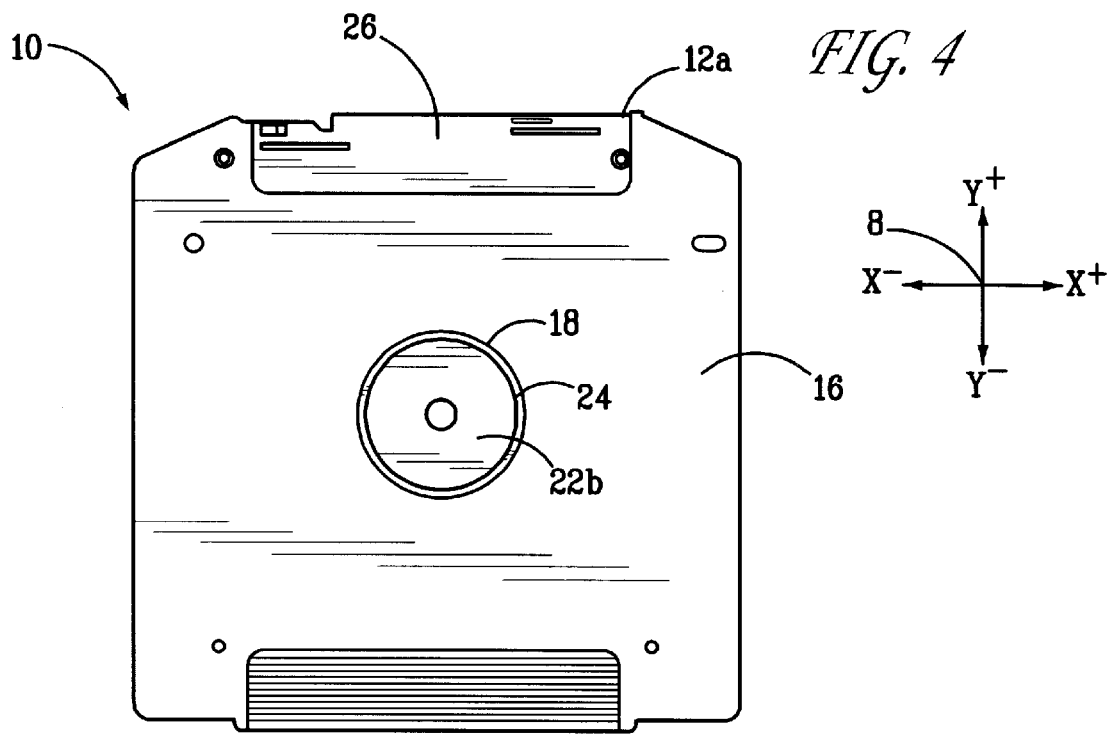
FIG. 4 is a bottom view of the data-storage cartridge shown in FIGS. 2 and 3.
Figure 6:
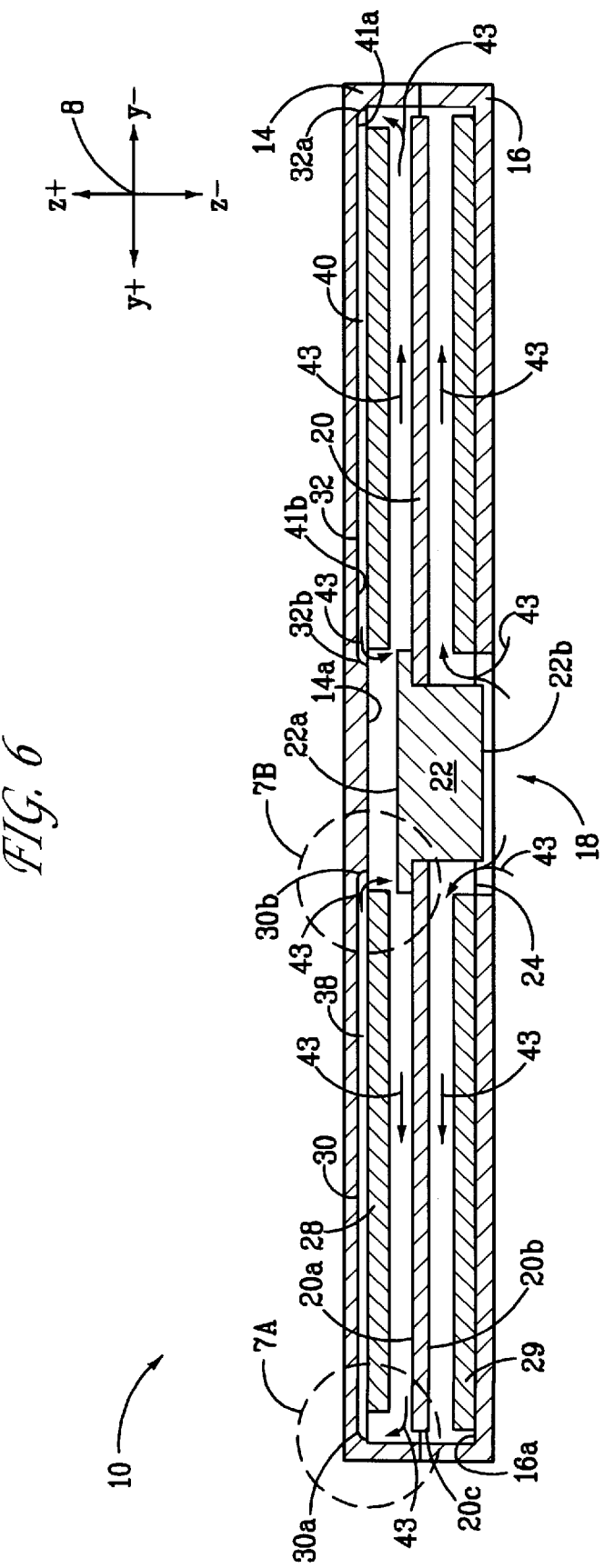
FIG. 6 is a sectional view of the data-storage cartridge shown in FIGS. 2 through 5 taken along the centerlines of a first and a second recesses formed in the outer shell upper half shown in FIG. 5.

The lower half 16 of the outer shell 12 defines a substantially circular hub access opening 18 (see FIGS. 4 and 6). The upper and lower shell halves 14 and 16 define a head access opening 19 (see FIGS. 2 and 3). The head access opening 19 extends inward from a side edge 12a of the outer shell 12. The functions of the hub access opening 18 and the head access opening 19 are discussed below.

The data-storage cartridge 10 also comprises a substantially circular data-storage medium 20 (see FIGS. 3 and 6). The data-storage medium 20 is a flexible (floppy) magnetic medium. (The invention is equally applicable to data-storage cartridges that utilize other types of data-storage media, e.g., optical media, and media that utilize rigid and semi-rigid-substrates). The data-storage medium 20 has an upper recording surface 20a and a lower recording surface 20b. (The terms "upper," "lower," "above," "below," "top," and "bottom" are used throughout the specification and claims with reference to the component orientations depicted in FIG. 6; the terms are used for illustrative purposes only, and are not intended to be otherwise limiting.)

The data-storage medium 20 also includes an outer edge 20c that forms the outer periphery of the data-storage medium 20 (see FIG. 6). The data-storage medium 20 also includes a centrally-disposed hub 22. The hub 22 has an upper surface 22a and a lower surface 22b. The data-storage medium 20 and the hub 22 are rotatably disposed within the outer shell 12. A portion of the hub 22 is positioned within the hub access opening 18 (see FIGS. 4 and 6). The hub 22 and the hub access opening 18 are sized so that a gap 24 is present between the hub 22 and the hub access opening 18. This arrangement allows the hub 22 to rotate freely within the hub access opening 18.

The lower recording surface 20b of the data-storage medium 20 faces the inner surface 16a of the outer shell lower half 16 (see FIG. 6). The upper recording surface 20a of the data-storage medium 20 faces the inner surface 14a of the outer shell upper half 14. The outer edge 20c of the data-storage medium 20 is positioned proximate the edges 14b and 14c of the inner surface 14a. The upper surface 22a of the hub 22 is positioned proximate a center of the inner surface 14a. The significance of these features is explained in detail below.

The hub access opening 18 permits the spindle of a disk drive (not shown) to engage the hub 22 when the data-storage cartridge 10 is inserted into the disk drive. The spindle is coupled to a spindle motor of the disk drive. The hub 22 is adapted to engage the spindle. This engagement facilitates rotation of the data-storage medium 20 by the spindle motor via the spindle and the hub 22.

The head access opening 19 allows the read/write heads of the disk drive to interface with the data-storage medium 20. In particular, the head access opening 19 permits the read/write heads to be positioned proximate the recording surfaces 20a and 20b, thereby allowing the heads to write and read data to and from the recording surfaces 20a and 20b. A spring-loaded shutter 26 is translatably disposed along the side edge 12a of the outer shell 12 (see FIG. 3).

The shutter 26 covers the head access opening 19 when the data-storage cartridge 10 is not inserted in the disk drive. The shutter 26 thereby protects the data-storage medium 20 from external contaminants. The shutter 26 slides away from the head access opening 19 upon insertion of the data-storage cartridge 10 into the disk drive. This action exposes the head access opening 19 and thereby allows the read/write heads to access the data-storage medium 20.

Figure 5:
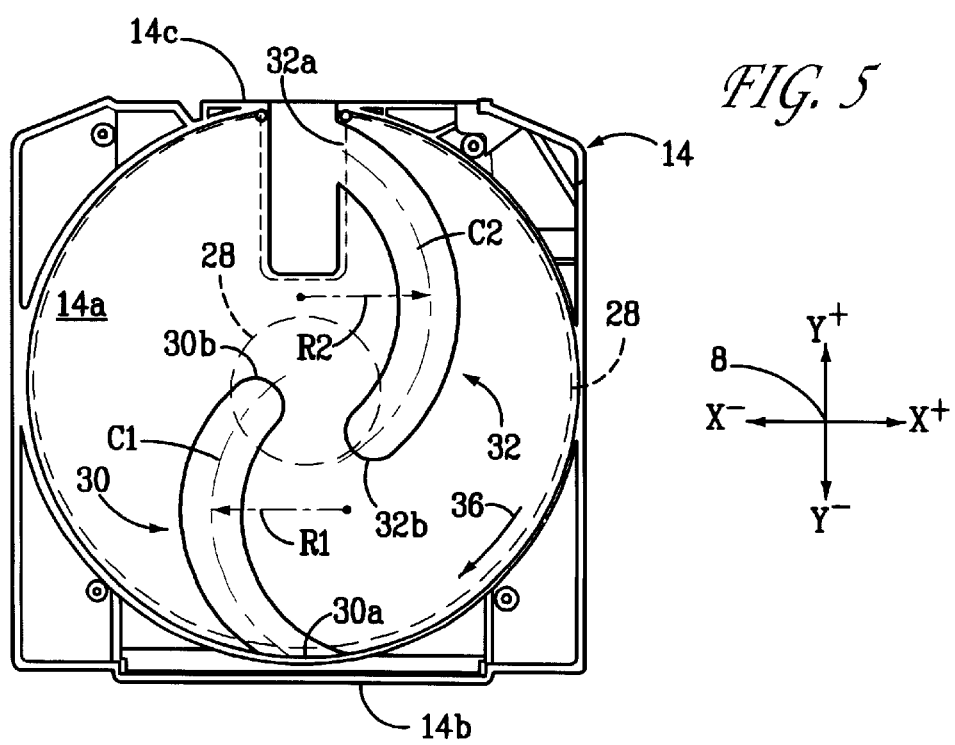
FIG. 5 is a bottom plan view of an upper half of an outer shell of the data-storage cartridge shown in FIGS. 2 through 4.

A liner 28 is attached to the inner surface 14a (see FIGS. 5 and 6). A liner 29 is attached to the inner surface 16a. Preferably, the liners 28 and 29 are formed from a mixture of non-woven fibers. The fibers are bonded together through conventional means such as an adhesive binder, thermal bonding, or a hydroentangling process. The liners 28 and 29 of the exemplary embodiment are formed from a mixture of rayon fibers (eighty percent) and nylon fibers (twenty percent). The "DataProtech Liner," available from Veratec Data Resources Group of Walpole, Mass., is suitable for use as the liners 28 and 29.

In accordance with the present invention, a first recess 30 and a second recess 32 are formed in the inner surface 14a of the outer shell upper half 14 (see FIGS. 5 and 6). The recess 30 has a first end 30a and a second end 30b. The first end 30a is positioned proximate the first edge 14b of the upper half 14. The second end 30b is positioned proximate the center of the inner surface 14a. The recess 30 thus extends from a position proximate the outer edge 20c of the data-storage medium 20 to a position proximate the hub 22. The significance of this feature is discussed in detail below.

The recess 32 likewise has a first end 32a and a second end 32b. The first end 32a is positioned proximate the second edge 14c of the outer shell upper half 14. The end 32a is preferably positioned along the head access opening 19 (see FIG. 5). The second end 32b of the recess 32 is positioned proximate the center of the shell inner surface 14a. The recess 32 thus extends from a position proximate the outer edge 20c of the data-storage medium 20 to a position proximate the hub 22.

The recess 30 has a centerline C1, and the recess 32 has a centerline C2 (see FIG. 5). The recesses 30 and 32 of the exemplary embodiment each have a width within a range of approximately 0.38 inch to 0.63 inch. (The term "width," as used in this context throughout the specification and claims, refers to the dimension of the recesses 30 and 32 in a direction substantially perpendicular to the respective centerlines C1 and C2.) The exemplary recesses 30 and 32 each have a depth (z dimension) within a range of approximately 0.040 inch to 0.060 inch. Hence, the recesses 30 and 32 each have a cross-sectional area within a range of approximately 0.015 inch to 0.038 inch.

The recesses 30 and 32 are preferably curved (see FIG. 5). The recess 30 has a radius of curvature denoted by the symbol "R1" shown in FIG. 5. The recess 32 has a radius of curvature denoted by the symbol "R2" shown in FIG. 5. Preferably, the radii of curvature R1 and R2 lie within a range of values as high as approximately a radius of the data-storage medium 20 and as low as approximately one-fourth of the radius of the data-storage medium 20. (The radius of the data-storage medium 20 is denoted by the symbol "R3" in FIG. 3).

The recesses 30 and 32 are oriented so that the recesses 30 and 32 extend both radially and circumferentially in relation to the data-storage medium 20. More particularly, the recesses 30 and 32 extend radially inward. The recesses 30 and 32 also extend in a circumferential direction that coincides with the direction of rotation of the data-storage medium 20 (the direction of rotation of the data-storage medium 20 is denoted by the arrow 36 shown in FIG. 5).

The liner 28 covers a portion of the recess 30 between the first end 30a and the second end 30b of the recess 30 (see FIGS. 5 and 6). The recess 30 and the liner 28 thereby form an enclosed passage 38 between the first and the second ends 30a and 30b (see FIG. 6). The liner 28 does not cover the first and the second ends 30a and 30b themselves. This arrangement forms an outer gap 39a between the liner 28 and the first end 30a (see FIG. 7A). An inner gap 39b is similarly formed between the liner 28 and the second end 30b (see FIG. 7B).

The liner 28 likewise covers a portion of the recess 32 between the first end 32a and the second end 32b of the recess 32 (see FIG. 6). The recess 32 and the liner 28 thereby form an enclosed passage 40 between the first and the second ends 32a and 32b. The liner 28 does not cover the first and the second ends 32a and 32b. This arrangement forms an outer gap 41a between the liner 28 and the first end 32a. An inner gap 41b is likewise formed between the liner 28 and the second end 32b.

Functional details relating to the passages 38 and 40 are as follows. The passage 38 allows air to flow between the first and the second ends 30a and 30b of the recess 30. The passage 40 similarly allows air to flow between the first and the second ends 32a and 32b of the recess 32. Hence, the passages 38 and 40 facilitate the circulation of air between the outer edge 20c and the hub 22 of the data-storage medium 20. Applicant has discovered that this circulation pattern substantially reduces or eliminates the previously-described pressure differential across the top and the bottom of the data-storage medium 20, for the reasons explained in detail below. Applicant has also found that the noted circulation pattern decreases oscillations in the data-storage medium 20 caused by rotation of the medium 20.

The passages 38 and 40 create the above-noted circulation pattern in the following manner. The relatively dense liner 28 acts as a barrier that inhibits air from permeating through the liner 28. Hence, placing the liner 28 over the recess 30 forms a conduit, i.e., the passage 38, that is capable of acting as an airflow channel. Placing the liner 28 over the recess 32 likewise forms a conduit, i.e., the passage 40, that potentially acts as an airflow channel.

The passages 38 and 40 each extend from a position proximate the outer edge 20c to a position proximate the hub 22 of the data-storage medium 20. The rotation of the data-storage medium 20, as previously explained, causes air to flow along the upper surface 20b of the data-storage medium 20 in an outward direction, i.e., toward the outer edge 20c of the medium 20 (the direction of the airflow within the data-storage cartridge 10 is denoted by various arrows 43 shown in FIGS. 6, 7A, and 7B). This airflow causes the aerodynamic pressure proximate the outer edge 20c to increase in relation to the aerodynamic pressure above the hub upper surface 22a.

Figure 7A:
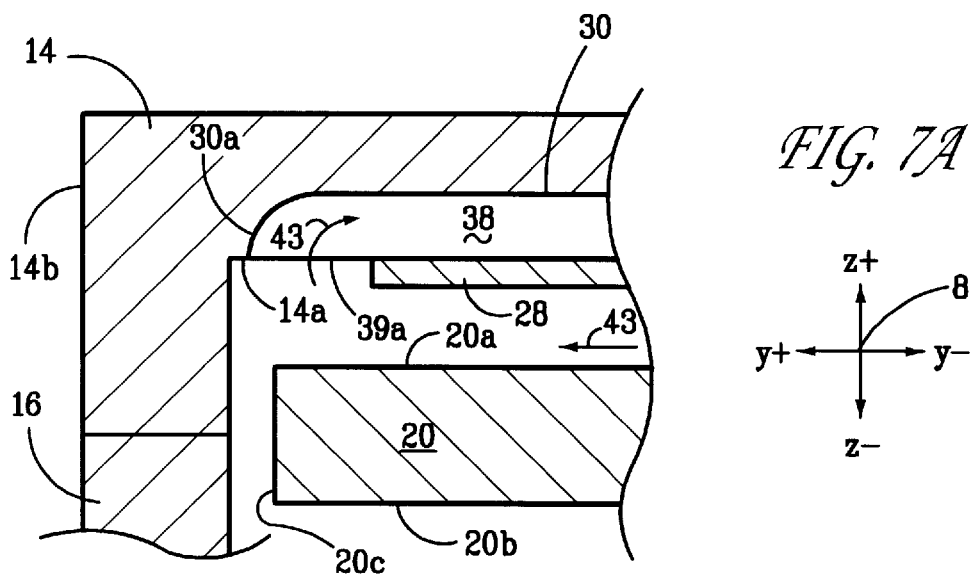
FIG. 7A is a magnified view of the area denoted "7A" in FIG. 6.

The outer gap 39a between the liner 28 and the end 30a of the recess 30 is positioned proximate the outer edge 20c of the data-storage medium 20 (see FIG. 7A). The outer gap 41a between the liner 28 and the end 32a of the recess 32 is also positioned proximate the outer edge 20c of the data-storage medium 20 (see FIG. 6). Hence, a portion of the air that is swept outward along the upper recording surface 20b is induced to flow into the passages 38 and 40 by way of the outer gaps 39a and 41a. In particular, the relatively high aerodynamic pressure proximate the outer edge 20c forces a portion of the outwardly-swept air through the outer gaps 39a and 41a and into the passages 38 and 40.

Figure 7B:
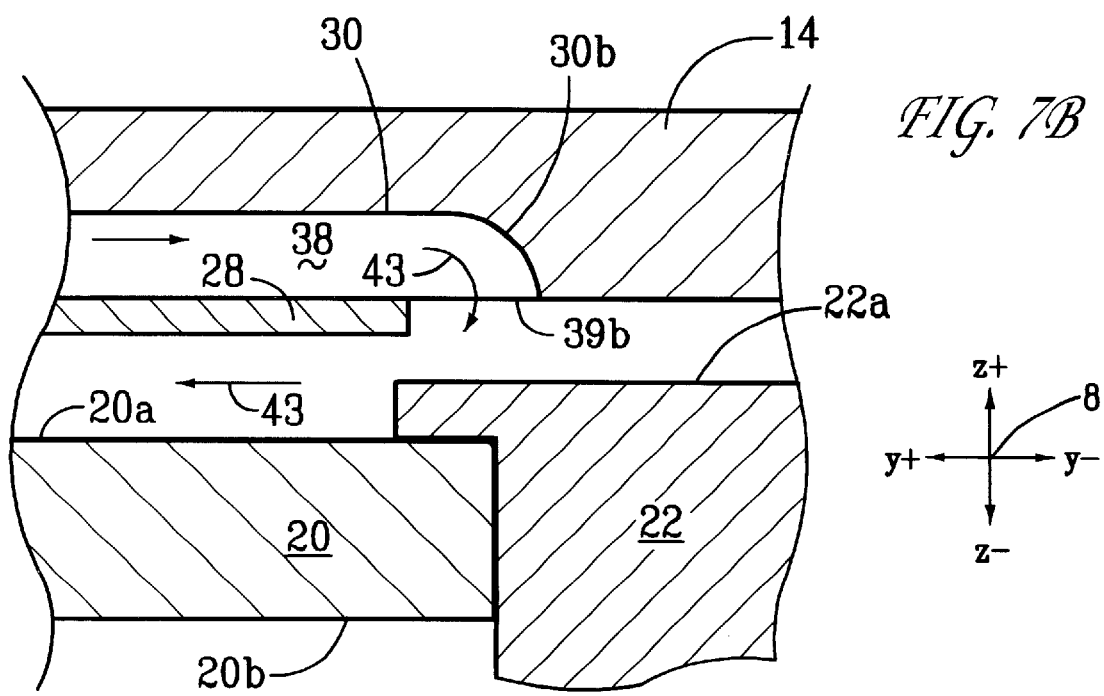
FIG. 7B is a magnified view of the area denoted "7B" in FIG. 6.

The inner gap 39b between the liner 28 and the end 30b of the recess 30 is positioned proximate the upper surface 22a of the hub 22 (see FIG. 7B). The inner gap 41b between the liner 28 and the end 32b of the recess 32 is likewise positioned proximate the hub upper surface 22a (see FIG. 6). Thus, the aerodynamic pressures proximate the inner gaps 39b and 41b are lower than the respective aerodynamic pressures proximate the outer gaps 39a and 41a. These pressure differentials cause the air entering the passages 38 and 40 by way of the gaps 39a and 41a to flow respectively through the passages 38 and 40, toward the inner gaps 39b and 41b. The air flowing through the passages 38 and 40 is eventually discharged proximate the hub upper surface 22a by way of the inner gaps 39b and 41b.

Furthermore, the air entering the passages 38 and 40 has a tangential velocity component due to the rotational motion of the data-storage medium 20. The curvilinear shape of the recesses 30 and 32 assists in converting this tangential velocity into a radial velocity, thereby encouraging the air to flow inward toward the hub 22.

The passages 38 and 40 facilitate the air-circulation pattern depicted by the arrows 43. Specifically, the rotational motion of the data-storage medium 20 causes air to circulate over the upper recording surface 20a of the data-storage medium 20, toward the outer edge 20c (see FIGS. 6, 7A, and 7B). A portion of this air flows into the passages 38 and 40 after reaching the outer edge 20c, as explained above. The air entering the passages 38 and 40 is eventually discharged from the passages 38 and 40 proximate the hub upper surface 22a. Hence, the passages 38 and 40 facilitate an air-circulation pattern that replenishes the air which flows away from the upper surface 22a of the hub 22 due to the rotational motion of the data-storage medium 20.

Applicant has discovered that replenishing the air which flows away from the upper surface 22a of the hub 22 inhibits the formation of a low-pressure area above the data-storage medium 20. Hence, the noted circulation pattern inhibits the formation of a substantial pressure differential across the top and the bottom of the data-storage medium 20.

Furthermore, the noted circulation pattern causes a relative increase in the airflow over the upper recording surface 20a. Applicant has found that this increased airflow reduces oscillations in the data-storage medium 20.

Applicant has evaluated the effects of the passages 38 and 40 on the operational characteristics of the data-storage cartridge 10. More particularly, Applicant has constructed a physical embodiment of the data-storage cartridge 10. Applicant has measured the vertical displacement of the data-storage medium 20 of this embodiment while the data-storage medium 20 was rotating at various velocities. The embodiment of the data-storage cartridge 10 utilized for this exercise was a standard IOMEGA® ZIP™ cartridge modified to include the passages 38 and 40 in accordance with the present invention.

Figure 8:
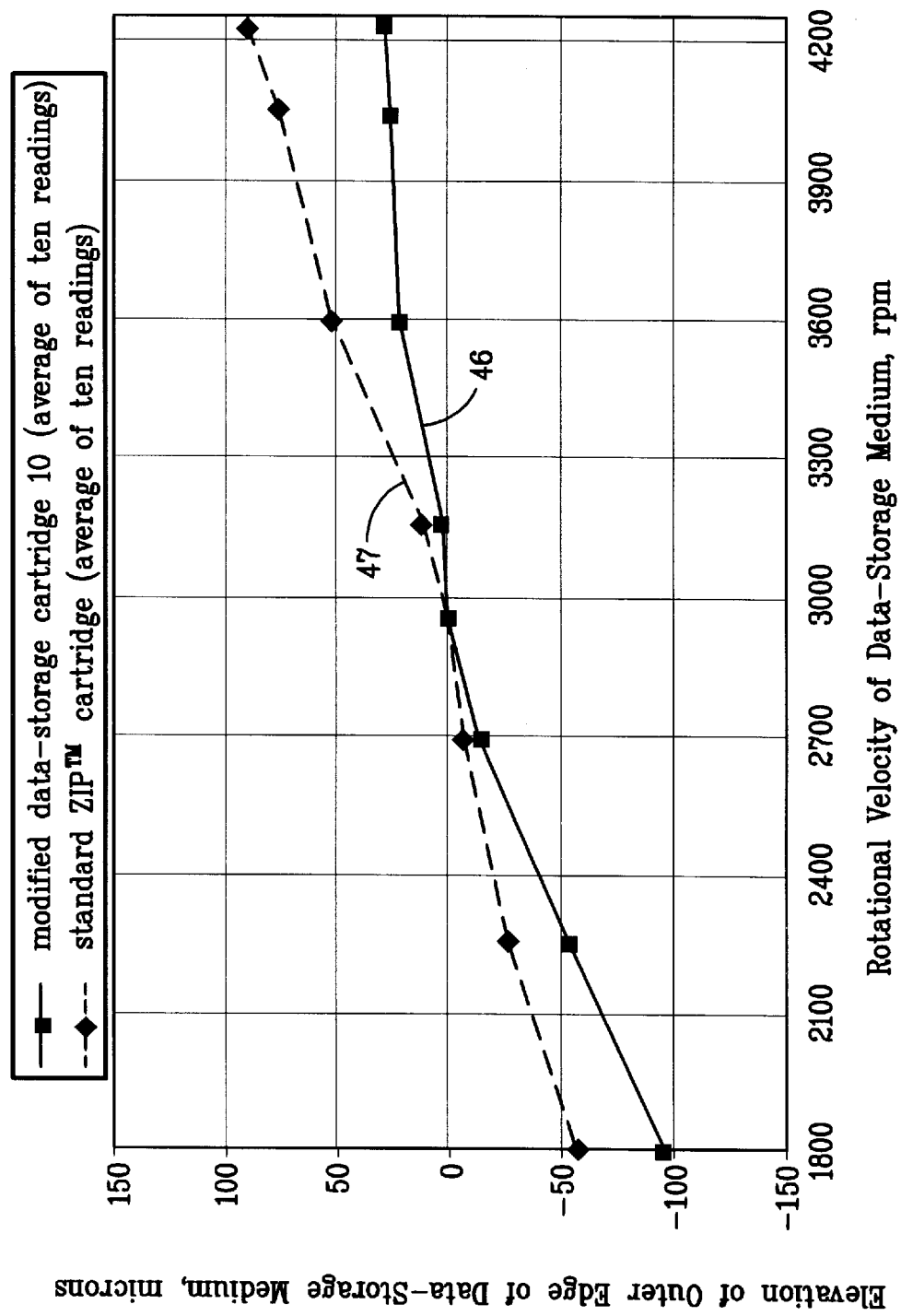
FIG. 8 is a graphical illustration showing the elevations of various data-storage media plotted as a function of the rotational velocities of the media.

The results of the above-noted exercise are presented in FIG. 8. FIG. 8 includes a first curve 46. The curve 46 represents the average measured elevation, i.e., position along the z axis, of the outer edge 20c of the data-storage medium 20. The elevation measurements are presented as a function of the rotational velocity of the medium 20. Each symbol on the curve 46 represents an average of ten elevation measurements acquired at a substantially identical rotational velocity. The ten individual measurements were acquired using ten different data-storage media 20 within a common outer shell 12. In other words, ten different data-storage media 20 (and ten different hubs 22) were swapped into and out of a single outer shell 12 during the course of this exercise. Each individual symbol along the curve 46 represents an average of the ten elevation measurements acquired at the corresponding rotational velocity using the ten different media 10.

FIG. 8 includes a second curve 47. The curve 47 was generated using ten standard ZIP™ cartridges. The curve 47 represents the average measured elevation of the outer edges of the data-storage media in the standard cartridges. The ten standard cartridges were each operated at a series of rotational velocities approximately identical to the velocities at which the modified data-storage cartridge 10 was operated. Each individual symbol along the curve 47 represents an average of the elevation measurements acquired at the corresponding rotational velocity using the ten standard ZIP™ cartridges. (The same data-storage media 20 were used in both the standard ZIP™ cartridges and the modified data-storage cartridge 10 during this exercise. In other words, the data-storage media 20 of the ten standard ZIP™ cartridges were removed from the standard cartridges and were installed and operated in the modified cartridge 10 over the course of this exercise.)

The curve 46 is offset so that the average elevation of the medium 20 at a rotational velocity of approximately 2,940 rpm corresponds to the zero value denoted on the vertical axis. The curve 47 is likewise offset so that the average media elevation for the standard ZIP™ cartridges at a rotational velocity of approximately 2,940 rpm also corresponds to the zero value denoted on vertical axis. (The standard ZIP™ cartridge normally operates at a rotational velocity of approximately 2,940 rpm. Applicant has offset the curves 46 and 47 as noted in order to more clearly illustrate the beneficial effects of the invention as operating velocities are increased above the current operating velocity of the ZIP™ cartridge.) FIG. 8 exemplifies the reductions in the vertical displacement of the data-storage medium 20 that are achievable through the use of the invention. For instance, the average elevation of the outer edge 20c of the medium 20 in the modified cartridge 10 was approximately thirty microns at a rotational velocity of approximately 4,230 rpm. The average measured elevation of the outer edges of the data-storage media in the ten standard ZIP™ cartridges was approximately ninety microns at approximately the same rotational velocity. Hence, the use of the invention reduced the vertical displacement of the data-storage medium 20 by approximately two-thirds at the noted rotational velocity. The potential benefits of reducing the vertical displacement of the data-storage medium 20 by such substantial amounts are discussed below.

Figure 9:
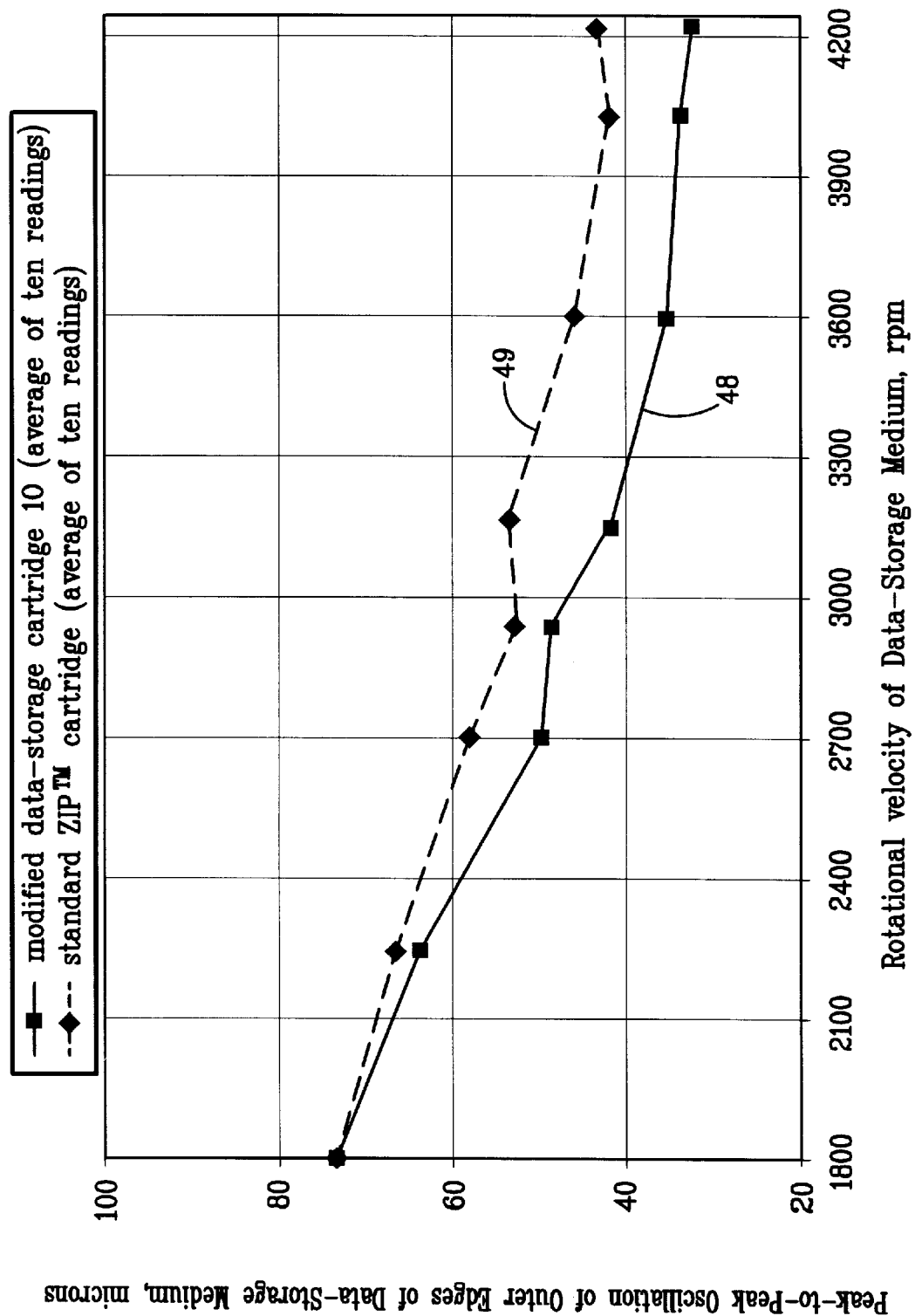
FIG. 9 is a graphical illustration showing the peak-to-peak oscillations in various data-storage media plotted as a function of the rotational velocities of the media.

Oscillation measurements were also acquired using the above-noted embodiment of the data-storage cartridge 10. In particular, peak-to-peak oscillations of the outer edges of the data-storage media in both the modified cartridge 10 and the ten standard ZIP™ cartridges were measured. The results of this exercise are presented in FIG. 9. FIG. 9 includes a first curve 48. The curve 48 represents the measured peak-to-peak oscillation of the outer edge 20c of the data-storage medium 20 in the modified cartridge 10. The oscillation measurements are presented as a function of the rotational velocity of the medium 20. Each symbol on the curve 48 represents an average of ten oscillation measurements acquired at a substantially identical rotational velocity. The oscillation measurements were acquired using the ten different data-storage media 20 and the common outer shell 12 utilized to obtain the previously-noted elevation measurements for the modified cartridge 10.

FIG. 9 includes a second curve 49. The curve 49 represents the measured peak-to-peak oscillation of the outer edges of the data-storage media in the ten standard ZIP™ cartridges. The ten standard cartridges were each operated at a series of rotational velocities substantially identical to the velocities at which the modified data-storage cartridge 10 was operated. Each symbol on the curve 49 represents an average of the oscillation measurements acquired at the corresponding rotational velocity.

FIG. 9 exemplifies the reductions in the peak-to-peak oscillations of the data-storage medium 20 that are achievable through the use of the invention. For instance, the average peak-to-peak oscillation at a rotational velocity of approximately 4,230 rpm was reduced by approximately one-fourth (from approximately forty-two microns to approximately thirty-three microns) due to the effects of the invention. The potential benefits of reducing oscillations in the data-storage medium 20 by such substantial amounts are discussed below.

The present invention provides substantial advantages associated with reducing or eliminating the pressure differential that typically exists between the top and bottom surfaces of a rotating data-storage medium such as the medium 20. Specifically, the air-circulation pattern facilitated by the invention alleviates the tendency of the medium 20 to rise toward the inner surface 14a of the outer shell 12, as noted above. In addition, the invention reduces rotation-induced oscillations in the data-storage medium 20 by increasing the rate of airflow across the upper recording surface 20a of the medium 20.

Reductions in the vertical displacement and oscillation of the data-storage medium 20 lower the potential for harmful contact between the medium 20 and the read/writes heads of a disk drive in which the data-storage cartridge 10 is utilized. Hence, the use of the invention offers potential improvements in the life and reliability of both the data-storage cartridge 10 and the read/write heads of the disk drive. In addition, reducing the vertical displacement and oscillation of the data-storage medium 20 can facilitate a reduction in the overall height (z dimension) of the data-storage cartridge 10. Reducing the external dimensions of the data-storage cartridge 10 can, in turn, lead to reductions in the overall dimensions of the disk drives in which the cartridge 10 is utilized. Reducing the external dimensions of the data-storage cartridge 10 and the corresponding disk drives represents a substantial benefit in the current market due to strong consumer demand for compact data-storage systems.

In addition, the enhanced circulation of air across the upper recording surface 20a of the data-storage medium 20 facilitates more effective cooling of the read/write head (this advantage is particularly beneficial with respect to optical heads, which are relatively sensitive to elevated operating temperatures). Also, the presence of the recesses 28 and 30 in the outer shell 12 reduces the amount of material needed to form the outer shell 12. This reduction can produce substantial cost savings due to the relatively large volumes in which data-storage cartridges such as the cartridge 10 are commonly produced.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, numerous variations in the shape and dimensions of the recesses 28 and 30 are possible within the contemplated scope of the invention. Also, the recesses 28 and 30 can be covered by a barrier other than the liner 28. More specifically, other types of barriers that prevent or inhibit the flow of air through the barrier, i.e., between one side of the barrier and the other, can be utilized to cover the recesses 28 and 30. In other words, the barriers can be formed from any material that is impermeable or semi-impermeable with respect to air.

Figure 10:
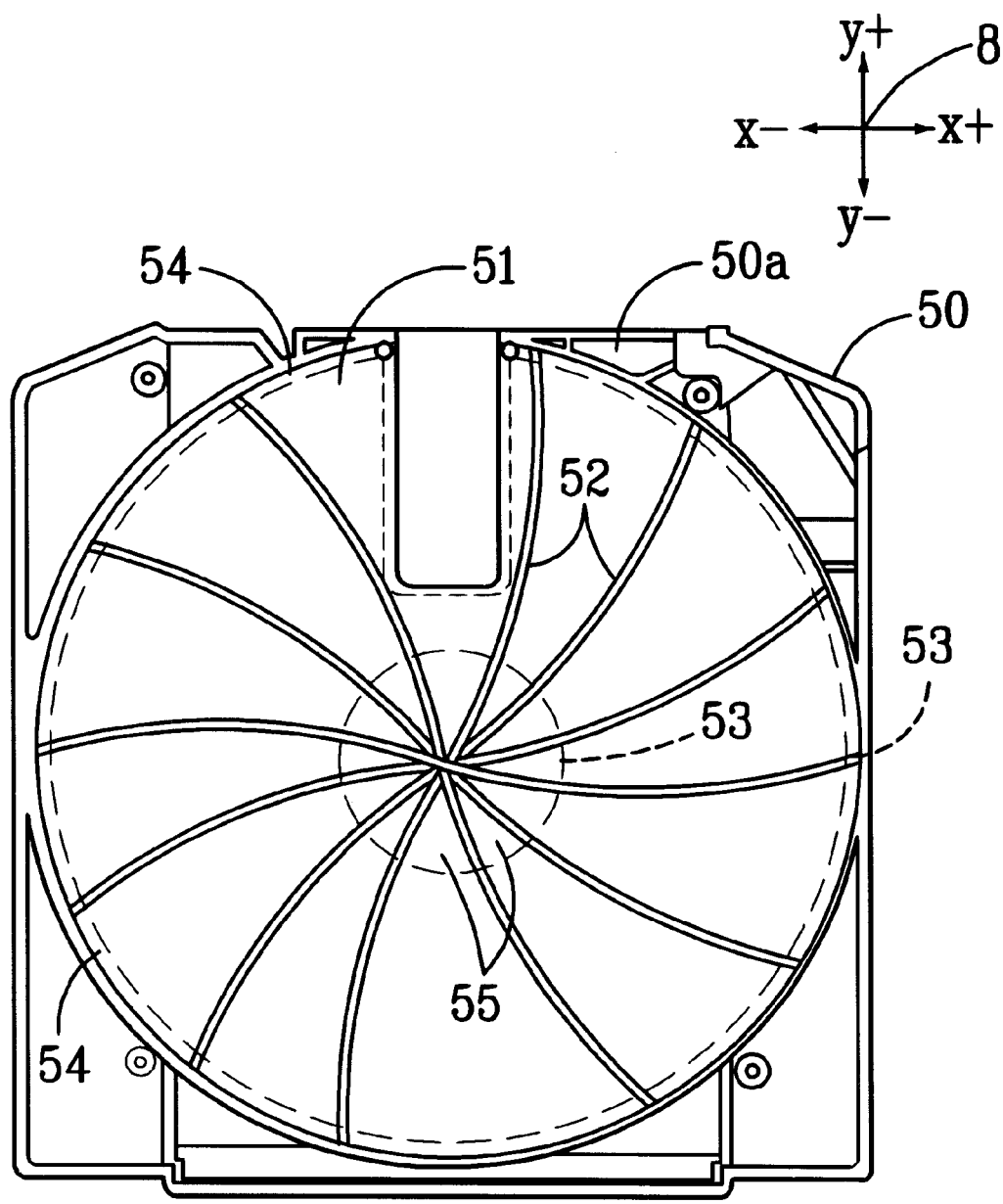
FIG. 10 is a bottom plan view of an upper half of an outer shell of a first alternative embodiment of the data-storage cartridge shown in FIGS. 2 through 7B.

Furthermore, the invention is not limited to data-storage cartridges 10 that utilize two of the recesses 28 and 30. The number of recesses may be decreased or increased depending on the degree of air circulation needed within a particular data-storage cartridge 10. FIG. 10 depicts a variant of the invention that provides a maximal amount of air circulation. FIG. 10 illustrates an upper half 50 of an outer shell that encloses a rotatable data-storage medium (not shown). The upper half 50 has an inner surface 50a. The inner surface 50a defines a recess 51. A plurality of ribs 52 are formed over the recess 51. A liner 53 is attached to the ribs (the ribs 52 are utilized exclusively to support the liner 53). A plurality of gaps 54 are present between the portions of the ribs 52 located radially outward of the liner 53. A plurality of gaps 55 are likewise present between the portions of the ribs 52 located radially inward of the liner 53. This configuration allows a maximal amount of air to circulate from the gaps 54 to the gaps 55 by way of the recess 51. (The shell upper half 50 can be used as part of a data-storage cartridge that is otherwise identical to the data-storage cartridge 10.)

Other potential variants of the invention may incorporate additional recesses. For example, recesses similar to the recesses 28 and 30 can be formed in the lower half 16 of the outer shell 12. FIG. 11 depicts a data-storage cartridge 10a equipped with this variation (the cartridge 10a is otherwise identical to the data-storage cartridge 10). The data-storage cartridge 10a includes a third recess 62 and a fourth recess 64 disposed along the inner surface 16a of the outer shell lower half 16. This configuration is applicable primarily to data-storage cartridges 10a that are used with disk drives having a spindle 66 (shown in phantom) that substantially fills the gap 24 between the hub access opening 18 and the hub 22 (thereby preventing air from flowing through the gap 24 and replenishing the air that is swept outward along the lower recording surface 22b).

Another possible variant within the contemplated scope of the invention is depicted in FIG. 12. FIG. 12 shows a data-storage cartridge 10b equipped with a filter 72 (the cartridge 10b is otherwise identical to the data-storage cartridge 10). The filter 72 is positioned across the inner gaps 39b and 41b. This filtering arrangement takes advantage of the flow through the passages 38 and 40 to remove contaminants from the air within the data-storage cartridge 10. (Alternatively, one or more filters 72 can be positioned across the outer gaps 39a and 40a, or within the passages 38 and 40.)

Figure 13:
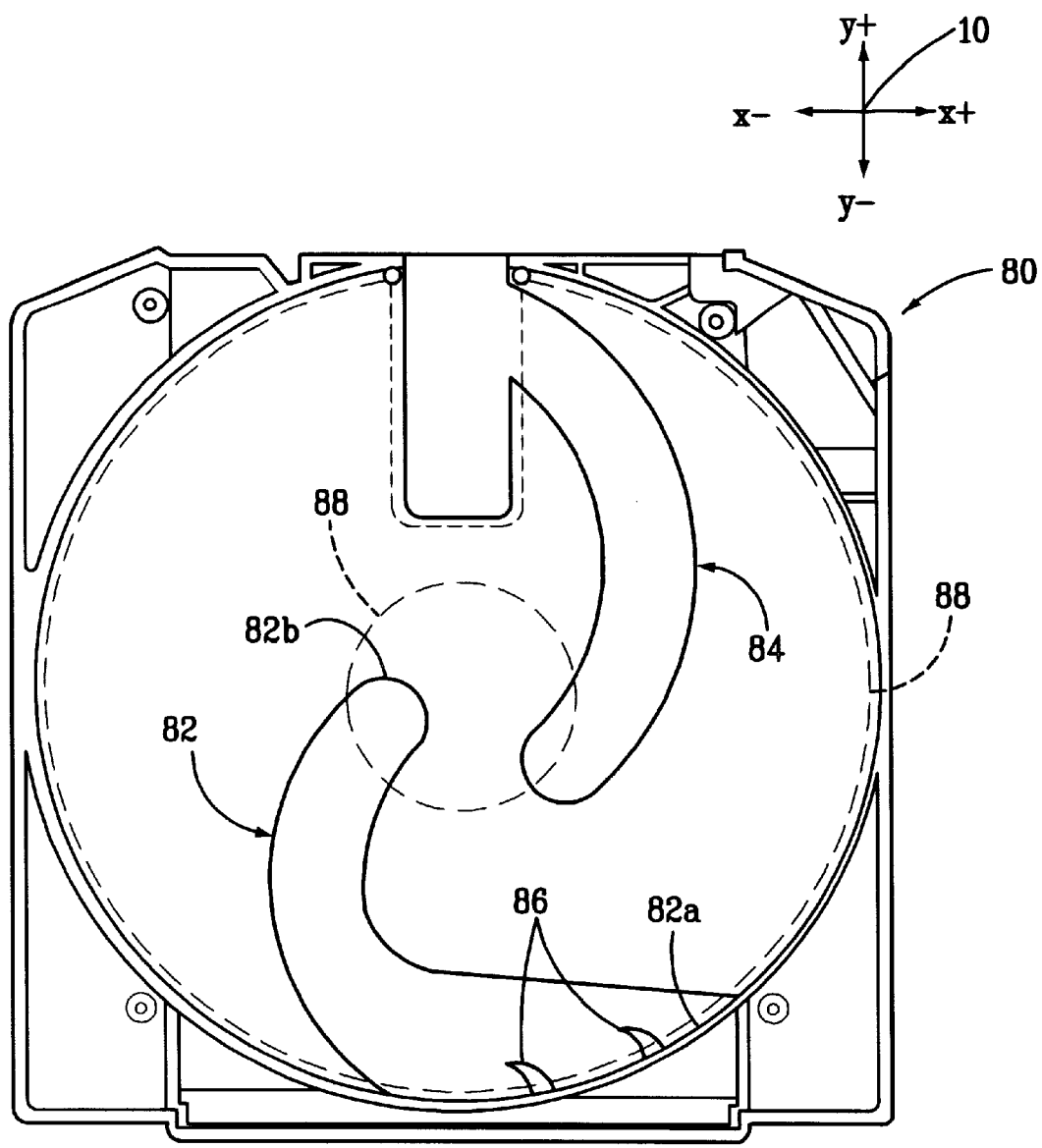
FIG. 13 is a bottom plan view of an upper half of an outer shell of a fourth alternative embodiment of the data-storage cartridge shown in FIGS. 2 through 7B.

FIG. 13 depicts another possible variant of the outer shell upper half 14. FIG. 13 shows an outer shell upper half 80 having a first recess 82 and a second recess 84. The second recess 84 is substantially identical to the second recess 32 on the outer shell upper half 14. The first recess 82 has a first end 82a and a second end 82b. The second end 82b is substantially identical to the second end 30b of the recess 30 on the outer shell upper half 14. The first end 82a is substantially wider than the first end 30a of the recess 30. More particularly, the width of the recess 82 increases between the approximate mid-point of the recess 82 and the first end 82a. This feature maximizes the amount of tangentially-flowing air that is captured by the recess 82 and directed inward toward the hub 22. Furthermore, a plurality of islands 86 are disposed in the recess 82 proximate the first end 82a. The islands 86 support a liner 88 as the liner 88 spans the relatively wide first end 82a.

What is claimed is:

1. A data-storage cartridge, comprising:
   an outer shell comprising (i) an upper half having an inner surface, the inner surface having a recess formed therein, the recess extending between a first position proximate an outer periphery of the inner surface and a second position proximate a center of the inner surface, and (ii) a lower half having a hub access opening formed therein, the hub access opening being substantially aligned with the center of the inner surface;
   a data-storage medium having a centrally-disposed hub and an outer edge, the data-storage medium being rotatably disposed within the outer shell so that at least a portion of the hub is positioned within the hub access opening and at least a portion of the outer edge is positioned proximate the outer periphery of the outer shell inner surface; and
   a liner positioned along the outer shell inner surface so that the liner covers a portion of the recess between the first and the second positions and the liner is substantially flat, the liner and the recess thereby forming a substantially unobstructed and enclosed passage having a first opening proximate the first position and a second opening proximate the second position for directing air toward the hub of the data-storage medium in response to rotation of the data-storage medium, whereby a difference in aerodynamic pressure across the data-storage medium is minimized.

2. The data-storage cartridge as recited in claim 1, wherein the liner and a first end of the recess define an outer gap and the liner and a second end of the recess define an inner gap, the outer gap and the inner gap permitting the air to flow into and out of the passage in response to the rotation of the data-storage medium.

3. The data-storage cartridge as recited in claim 2, wherein the rotation of the data-storage medium causes the air to flow into the passage through the outer gap and out of the passage through the inner gap.

4. The data-storage cartridge as recited in claim 1, wherein the recess is curved.

5. The data-storage cartridge as recited in claim 4, wherein the recess simultaneously extends (i) radially inward in relation to the data-storage medium and (ii) circumferentially in a direction of rotation of the data-storage medium.

6. The data-storage cartridge as recited in claim 4, wherein the recess has a radius of curvature within a range of values as high as approximately a radius of the data-storage medium and as low as approximately one-fourth of the radius of the data-storage medium.

7. The data-storage cartridge as recited in claim 1, wherein a second recess is formed in the inner surface of the outer shell.

8. The data-storage cartridge as recited in claim 1, wherein the recess has a cross-sectional area within a range of approximately 0.015 inch to 0.038 inch.

9. The data-storage cartridge as recited in claim 1, wherein the liner comprises rayon fibers and nylon fibers.

10. A data-storage cartridge, comprising:
    a rotatable data-storage medium having a centrally-disposed hub and an outer peripheral edge;
    an outer shell enclosing at least a portion of the data-storage medium and having an inner surface facing toward the data-storage medium, the inner surface having a recess formed therein, the recess having a first end proximate an outer edge of the outer shell and a second end proximate a center of the outer shell; and a liner attached to the inner surface of the outer shell so that the liner covers a portion of the recess between the first and the second ends of the recess and the liner is substantially flat, whereby the recess and the liner form a substantially unobstructed and enclosed passage having a first opening proximate the first end of the recess and a second opening proximate the second end of the recess for directing air toward the hub of the data-storage medium in response to rotation of the data-storage medium.

11. The data-storage cartridge as recited in claim 10, wherein the first end of the recess is located proximate the outer peripheral edge of the data-storage medium and the second end of the recess is located proximate the hub of the data-storage medium.

12. The data-storage cartridge as recited in claim 11, wherein the liner and the first end of the recess define an outer gap and the liner and the second end of the recess define an inner gap, the outer gap and the inner gap permitting the air to flow into and out of the passage in response to the rotation of the data-storage medium.

13. The data-storage cartridge as recited in claim 12, wherein the rotation of the data-storage medium causes the air to flow into the passage through the outer gap and out of the passage through the inner gap, whereby the air is circulated toward the hub and a difference in aerodynamic pressure above and below the data-storage medium is minimized.

14. The data-storage cartridge as recited in claim 12, further comprising a filter, at least a portion of the filter being positioned across at least one of the outer gap, the inner gap, and the passage.

15. The data-storage cartridge as recited in claim 10, wherein the outer shell includes a first and a second of the inner surfaces, the first inner surface opposing the second inner surface, the recess being formed in the first inner surface and the second inner surface defining a hub access opening, at least a portion of the hub being rotatably disposed within the hub access opening.

16. The data-storage cartridge as recited in claim 15, wherein a second recess is formed in the second inner surface.

17. The data-storage cartridge as recited in claim 10, wherein the recess is curved.

18. The data-storage cartridge as recited in claim 17, wherein the recess simultaneously extends (i) radially inward in relation to the data-storage medium and (ii) circumferentially in a direction of rotation of the data-storage medium.

19. The data-storage cartridge as recited in claim 17, wherein the recess has a radius of curvature within a range of values as high as approximately a radius of the data-storage medium and as low as approximately one-fourth of the radius of the data-storage medium.

20. The data-storage cartridge as recited in claim 10, wherein a second recess is formed in the inner surface of the outer shell.

21. The data-storage cartridge as recited in claim 20, wherein the first end of the first recess is positioned proximate a first outer edge of the outer shell inner surface and the first end of the second recess is positioned proximate a second outer edge of the outer shell inner surface, the first outer edge opposing the second outer edge.

22. The data-storage cartridge as recited in claim 10, wherein the recess has a cross-sectional area within a range of approximately 0.015 inch to 0.038 inch.

23. The data-storage cartridge as recited in claim 10, wherein the liner comprises rayon fibers and nylon fibers.

24. The data-storage cartridge as recited in claim 10, wherein the outer shell includes a head access opening and the first end of the recess is disposed along an edge of the head access opening.

25. The data-storage cartridge as recited in claim 10, wherein the data-storage medium is a floppy medium.

26. The data-storage cartridge as recited in claim 10, wherein the data-storage medium is a magnetic medium.

27. The data-storage cartridge as recited in claim 10, wherein the inner surface of the outer shell defines a plurality of ribs extending from a first position proximate the outer peripheral edge of the data-storage medium to a second position proximate the hub of the data-storage medium, the liner being attached to the ribs so that the liner covers at least a portion of t he recess.

28. The data-storage cartridge as recited in claim 10, wherein the first end of the recess is wider than the second end of the recess.

29. A data-storage cartridge, comprising:

a data-storage medium being rotatable about a center hub;

an outer shell having an inner surface, the outer shell enclosing the data-storage medium so that at least a portion of the inner surface is positioned above the data-storage medium, the inner surface having a recess formed therein, the recess extending between a first position proximate an outer periphery of the inner surface and a second position proximate a center of the inner surface; and an airflow barrier, the airflow barrier covering a portion of the recess between the first and the second positions and being substantially flat so that the airflow barrier and the recess form a substantially unobstructed and enclosed passage extending between the first and the second positions and having a first opening proximate the first position and a second opening proximate the second position for circulating air toward the hub of the data-storage medium in response to rotation of the data-storage medium.

30. The data-storage cartridge as recited in claim 29, wherein the first position is located proximate an outer edge of the inner surface of the outer shell and the second position is located proximate a center of the inner surface of the outer shell.

31. The data-storage cartridge as recited in claim 30, wherein the airflow barrier and a first end of the recess define an outer gap, the airflow barrier and a second end of the recess define an inner gap, and the rotation of the data-storage medium causes the air to flow into the passage through the outer gap and out of the passage through the inner gap, whereby the air is circulated toward the hub and a difference in aerodynamic pressure above and below the data-storage medium is minimized.

32. The data-storage cartridge as recited in claim 31, further comprising a filter, at least a portion of the filter being positioned across at least one of the outer gap, the inner gap, and the passage.

33. The data-storage cartridge as recited in claim 29, wherein the airflow barrier is a fabric liner.

34. The data-storage cartridge as recited in claim 31, wherein the fabric liner comprises rayon fibers and nylon fibers.

35. The data-storage cartridge as recited in claim 29, wherein the outer shell includes a first and a second of the inner surfaces, the first inner surface opposing the second inner surface, the recess being formed in the first inner surface and the second inner surface defining a hub access opening, at least a portion of the hub being rotatably disposed within the hub access opening.

36. The data-storage cartridge as recited in claim 29, wherein the recess is curved.

37. The data-storage cartridge as recited in claim 36, wherein the recess simultaneously extends (i) radially inward in relation to the data-storage medium and (ii) circumferentially in a direction of rotation of the data-storage medium.

38. The data-storage cartridge as recited in claim 36, wherein the recess has a radius of curvature within a range of values as high as approximately a radius of the data-storage medium and as low as approximately one-fourth of the radius of the data-storage medium.

39. The data-storage cartridge as recited in claim 29, wherein a second recess is formed in the inner surface of the outer shell.

40. The data-storage cartridge as recited in claim 29, wherein the recess has a cross-sectional area within a range of approximately 0.015 inch to 0.038 inch.

41. The data-storage cartridge as recited in claim 29, wherein a first end of the recess is wider than a second end of the recess.

* * * * *